United States Patent Office
2,770,869
Patented Nov. 20, 1956

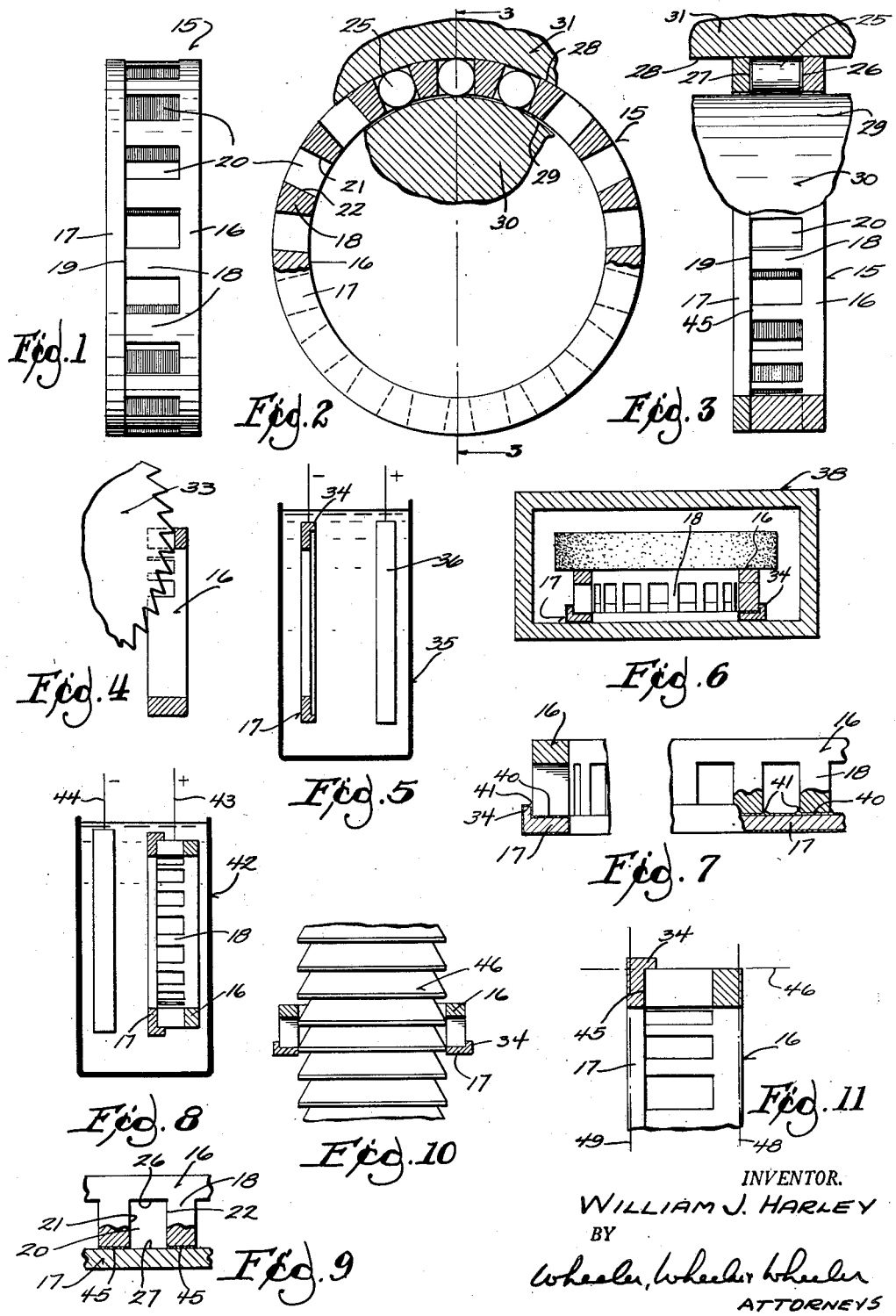

2,770,869

METHOD OF MAKING ROLLER BEARING CAGE

William J. Harley, Milwaukee, Wis., assignor to Harley-Davidson Motor Co., Milwaukee, Wis., a corporation of Wisconsin Application December 21, 1953, Serial No. 399,529

8 Claims. (Cl. 29—148.4)

This invention relates to a roller bearing and method of production thereof.

The bearing is specifically designed for use between a crank pin and connecting rod of an internal combustion engine, but its application is by no means limited to this service. The bearing is characterized by the fact that its cage comprises two separate annular parts in brazed connection, at least one of these parts having integral dividers which provide parallel faces between which the bearing rollers are confined. The method of production is such as to assure the utmost accuracy and to permit the spaces for the rollers to be formed by milling operations rather than drilling, broaching or riveting operations, whereby all roller confining surfaces of the cage are planiform both at the sides and the ends of the bearing rollers. It is believed that in the past cages or retainers having planiform surfaces confining the rollers have been made only by broaching soft metal blanks at great expense, the use of soft metal being required to make the practice at all practicable. Yet such soft metal retainers are subject to excessive wear and, when the wear becomes sufficient to permit a roller or rollers any freedom of movement, the resulting displacement frequently permits the roller to cut through the end wall of the retainer, completely destroying the bearing. The present method permits the retainer to be made economically of steel for long life and assured precision fit.

The method includes separate fabrication of a closure ring and a ring which carries the dividers and brazing the rings together after applying copper, brass or silver paste or electrolytic deposit of brazing metal on at least one of the parts. The method further contemplates that the parts be provided temporarily with means for physically interlocking them with precision in the desired relative positions while they are exposed to brazing temperatures in an oven. After the brazing operation, it is an optional step to remove excess brazing metal electrolytically. Thereupon the assembled cage is machined internally and externally to precise dimensions, the machining operation serving to remove the structure temporarily used to assure proper registration of the parts during brazing.

Hereafter reference will be made only to copper, it being understood that this is merely representative of any appropriate brazing metal.

In the drawings:

Fig. 1 is a view in side elevation of a completed bearing cage embodying the invention, the cage being shown on an enlarged scale.

Fig. 2 is a view partially in end elevation and partially in section of the cage of Fig. 1, the relation of the cage to the rollers and the inner and outer surfaces being fragmentarily included.

Fig. 3 is a view taken in transverse section on the line 3—3 of Fig. 2.

Fig. 4 is a fragmentary detailed view in substantially accurate scale showing the milling of the roller receiving slots in one of the cage elements.

Fig. 5 is a view diametrically showing the copper plating of the other of the cage elements, the plating tank being shown in sections.

Fig. 6 is a view in transverse section through the cage elements as they appear in the brazing oven.

Fig. 7 is a view on an enlarged scale partially in side elevation and partially in section showing the assembled cage as it appears following brazing.

Fig. 8 is a view similar to Fig. 5 diametrically illustrating the "reverse plating" operation in which excess copper is removed.

Fig. 9 is a fragmentary detailed view on an enlarged scale showing a portion of the cage after removal of the excess copper.

Fig. 10 is a view showing a final broaching operation on the interior of the cage, the cage being shown in transverse section.

Fig. 11 is a fragmentary detailed view of the cage in transverse section showing the materials removed from its outer periphery by turning in a lathe to complete the cage.

The complete bearing cage 15, shown in Fig. 1, comprises rings 16 and 17 having axially extending dividers 18 integral with one of the rings and to the ends of which the other ring is brazed at 19. These dividers provide bearing pockets 20 which have planiform faces at 21 and 22 that are desirably parallel for engagement with the bearing rollers 25. The end faces 26 and 27 which confine the rollers 25 are, as shown in Fig. 1 and Fig. 3, also desirably parallel. This form would otherwise require broaching.

It is one of the features of the invention that the bearing is so designed that the outer periphery of the cage 15 substantially corresponds to the inner peripheral surface 28 which constitutes the outer race for the rollers 25. Thereby, as shown in Fig. 2 and Fig. 3, the inner peripheral surfaces of the cage are slightly spaced from the cylindrical surface 29 which constitutes the inner race. By way of exemplification only, the surface 29 may be assumed to be that of an engine crank 30 and the surface 28 may be assumed to be formed on a connecting rod 31.

The ring receiving pockets 20 are milled in the annulus 16 by relative movement of milling cutter 33 radially of the annulus, as shown in Fig. 4. This leaves the bottom surfaces 26 planiform and at right angles to the side surfaces 21 and 22 of the roller pockets.

The side surfaces are symmetrical and parallel with respect to the intervening radius of the annulus. The complementary ring 17 is desirably machined in such manner as to provide a mechanical interlock temporarily used to register this ring with ring 16 during brazing. In the preferred form, this interlock constitutes an annular flange 34 which fits about the ends of the dividers 18 which are formed when the roller receiving pockets 20 are milled in annulus 16.

While the brazing metal may be applied in the form of paste or otherwise, I have chosen, for the purposes of this disclosure to illustrate a procedure whereby the machined annulus 17 is placed in a plating tank 35 and is electroplated with copper by connecting it to the negative side of an electrical circuit, the positive side of which is connected to an anode 36, usually of copper. When sufficient copper has been deposited to provide for a brazed connection of the parts, plating is discontinued and the ring elements 16 and 17 are assembled and placed in a brazing oven 38, as shown in Fig. 6. The flange 34 is here illustrated as embracing the free ends of the dividers 18 to maintain the parts in exact registration. During brazing the oven is heated to a temperature of approximately 2,000° F. and contains hydrogen or other reducing atmosphere to preclude oxidation at this temperature. In practice, the parts are loaded to maintain them in tight assembly during the brazing operation. This is done, conveniently, by superimposing on the ring 16 in the brazing oven 38 a carbon block weighing about two pounds.

Fig. 7 shows the parts after the brazing operation. The rings 16, 17 are now securely united by the film of copper at 40 but the copper will have formed fillets at 41 and will be present on other exposed surfaces to which it was plated in the tank 35.

In some methods of brazing there may be no excess of brazing material. However, if the brazing metal has been electrolytically deposited, there may be an excess.

To remove any excess of copper, the assembled cage is now placed in a tank 42 which is similar to the tank 35, but the cage is now connected to the positive line 43 of a direct current circuit, the negative side of which may be connected to a copper bar or other cathode at 44. The current is allowed to flow for a time sufficient to remove the exposed copper without affecting the brazing copper which is present in a bonding film 45 between the ring 17 and the ends of dividers 18, as shown in Fig. 9.

To complete the cage, the inner periphery thereof is machined, as by a broach 46 shown in Fig. 10. Finally, the cage is turned or ground as shown in Fig. 11, to machine all of its external surfaces. Its outer periphery is reduced to the line 46 of Fig. 11, whereby the annular flange used for registration in the brazing oven is wholly cut away. The end surfaces are reduced to the planes indicated at 48 and 49, thus completing the cage. Its external diameter is related to the inner and outer races in the manner already described and illustrated in Figs. 2 and 3. It is broadly immaterial whether the cage or retainer is in bearing engagement with the inner or the outer race, but it is desirable that it have a bearing fit to one or the other in order to relieve the roller bearings of the weight of the cage and the centrifugally induced forces to which the cage is subject. If these forces are sustained by the rollers, they restrain freedom of roller movement.

However, inasmuch as the retainer of the present invention is made of steel, unlike the aluminum or bronze retainers which are the closest comparable form in the prior art, and inasmuch as the races are also made of steel, it becomes desirable to plate the cages or retainers with cadmium or other finish, as a final operation to promote freedom of bearing movement. The finished product of Fig. 1 will be understood to be so plated.

I claim:

1. A method of bearing cage manufacture which comprises pre-fabrication of separate annuli, at least one of which is sufficiently thick in its axial dimension solely to provide dividers between bearing pockets, radially milling pockets in the last mentioned annulus, leaving portions of such annulus to constitute said dividers between successive pockets, the other annulus comprising a ring having a continuous annular face, and securing said other annulus to the last mentioned annulus with the ends of said dividers abutting said face, the face portions between said dividers closing such pockets.

2. The method recited in claim 1 in which the securing of the annuli is effected by brazing.

3. The method of claim 1 in which at least one of said annuli is plated with a brazing metal and the annuli are thereupon assembled and subjected to brazing temperatures in an oven.

4. The device of claim 3 in which excess of said brazing metal is electrolytically removed following the brazing operation.

5. A method of bearing cage manufacture which comprises the fabrication of a pair of cage annuli having telescopically engageable interlocking parts, one of said annuli comprising bearing element pockets and the other comprising a closure for such pockets, assembling said annuli with said parts in interlocking engagement, brazing the assembled annuli together and subsequently machining away one of said interlocking parts to leave the brazed parts as the sole means for holding the parts together.

6. A method of bearing cage manufacture which includes fabrication of a toothed annulus providing bearing pockets between its teeth, fabrication of a separate annulus having a peripheral flange engageable with the ends of said teeth for positioning the said separate annulus as a closure for said pockets, engaging the annuli in positions determined by engagement of the flange with the teeth, securing the annuli with means holding the annuli together while so positioned and subsequently machining away the flange to leave the securing means as sole means for holding the annuli in relative position.

7. The device of claim 6 in which the flanged annulus is electroplated with abrazing metal before the annuli are associated, the securing of said annuli being an oven brazing operation while the annuli are relatively positioned by said flange.

8. The method recited in claim 7 in which excess of electrolytically deposited brazing metal is electrolytically removed following the brazing operation.

References Cited in the file of this patent

UNITED STATES PATENTS

| | | |
|---|---|---|
| 1,373,726 | Heiby | Aug. 5, 1921 |
| 1,650,853 | Rouanet | Nov. 29, 1927 |
| 1,650,854 | Rouanet | Nov. 29, 1927 |
| 1,733,673 | Rouanet | Oct. 29, 1929 |
| 1,823,450 | Helmand | Sept. 15, 1931 |
| 2,255,301 | Thompson | Sept. 9, 1941 |
| 2,342,340 | Hickling | Feb. 22, 1944 |
| 2,409,236 | Banker | Oct. 15, 1946 |
| 2,483,695 | Edwards | Oct. 4, 1949 |
| 2,590,939 | Cobb | Apr. 1, 1952 |
| 2,696,412 | Blair | Dec. 7, 1954 |

FOREIGN PATENTS

| | | |
|---|---|---|
| 661,409 | France | July 26, 1929 |